US007063881B1

(12) United States Patent
Matich

(10) Patent No.: US 7,063,881 B1
(45) Date of Patent: Jun. 20, 2006

(54) STRUCTURAL ARTICLES WITH LOAD BEARING CAPABILITIES

(75) Inventor: Frank Anthony Matich, Bayview (AU)

(73) Assignee: Armacel Pty Limited, Terrey Hills (AU)

( * ) Notice: Subject to any disclaimer, the term of this patent is extended or adjusted under 35 U.S.C. 154(b) by 0 days.

(21) Appl. No.: 10/398,723

(22) PCT Filed: Mar. 24, 2000

(86) PCT No.: PCT/AU00/00250

§ 371 (c)(1),
(2), (4) Date: Oct. 30, 2003

(87) PCT Pub. No.: WO00/59709

PCT Pub. Date: Oct. 12, 2000

(30) Foreign Application Priority Data

Mar. 30, 1999 (AU) .................................. PP9503

(51) Int. Cl.
*B32B 1/04* (2006.01)
*B32B 3/00* (2006.01)

(52) U.S. Cl. .................. 428/161; 428/68; 428/163; 428/172

(58) Field of Classification Search ............... 428/161, 428/162, 163, 172, 68; 156/212, 285; 264/319
See application file for complete search history.

(56) References Cited

U.S. PATENT DOCUMENTS 4,894,102 A * 1/1990 Halls et al. .................... 156/94

FOREIGN PATENT DOCUMENTS

| EP | 0 302 703 A2 | 2/1989 |
| GB | 2 334 475 A | 8/1999 |
| WO | WO 96/23682 | 9/1995 |
| WO | WO 97/09166 | 3/1997 |

* cited by examiner

Primary Examiner—Donald J. Loney
(74) Attorney, Agent, or Firm—Bell, Boyd & Lloyd LLC

(57) ABSTRACT

A method of forming a structural article from a shape defining interior member (20) and at least one external skin (22). The interior member has at least one surface (23) with channels extending to the periphery thereof. The method comprises heating a thermoplastics sheet intended to form said external skin (22) and bringing the heated sheet (22) alongside the surface (23) of the interior member (20) and into initial contact with same. A fluid pressure differential is then applied between opposite surfaces of the interior member (20) and the sheet (22) to conform the sheet (22) to the shape of the interior member (20) and mutually engage same. Fluid trapped between the sheet (22) and the member (20) escapes through the ends of the channels of the member (20) as the sheet (22) is drawn into substantially conformity with the surface (23) having the channels. The fluid pressure differential is maintained until the sheet (22) has cooled whereupon tensional forces arise in the sheet (22) in all directions. Articles having load bearing capabilities formed by the above method are also disclosed.

16 Claims, 4 Drawing Sheets

STRUCTURAL ARTICLES WITH LOAD BEARING CAPABILITIES

FIELD OF THE INVENTION

The present invention relates to an improved method for forming a structural article from a shape defining interior member and at least one external skin. The invention also relates to the articles formed by the improved method.

BACKGROUND OF THE INVENTION

A method and apparatus for forming structural articles (known as the ARMACEL process), and articles so formed, is disclosed in the applicant's international PCT patent application No. PCT/AU95/00100 entitled "A method and apparatus for forming structural articles" (WO 95/23682) and international PCT patent application No. PCT/AU96/00541 entitled "Layered Structural Article" (WO 97/09166).

These applications disclose forming structural articles from a shape defining interior member and at least one external skin in which the interior member is at least partially fluid permeable. The basic steps of the method comprise: (1) heating a thermoplastics sheet intended to form the external skin; (2) bringing the heated sheet alongside the interior member; (3) applying a fluid pressure differential between opposite surfaces of the interior member and the sheet to conform the sheet to the shape of the interior member and mutually engage same; and (4) maintaining the fluid pressure differential until the sheet has cooled. At the commencement of step (3), the headed sheet forms a seal around the periphery of the interior member which traps air between the adjacent surfaces of the sheet and the interior member. During step (3), the air trapped between the sheet and the interior member is removed by being drawn through the (at least partially fluid permeable) interior member by the pressure differential.

This method requires the interior member to inherently be at least partially fluid permeable or to be modified so as to be at least partially fluid permeable, for example by punching holes into the member. Further, fluid permeability in one direction is lost when a skin is applied to one side of the member and holes must be then placed in that skin in order to allow the application of another skin to the other side of the member.

It is an object of the present invention to provide an improved method in which the shape defining interior member does not necessarily have to be at least partially fluid permeable.

SUMMARY OF THE INVENTION

According to a first aspect of the present invention there is disclosed a method of forming a structural article from a shape defining interior member and at least one external skin, said interior member having at least one surface with channels extending to the periphery thereof, said method comprising the steps of:

(1) heating a thermoplastics sheet intended to form said external skin;

(2) bringing the heated sheet alongside the surface of said interior member having said channels and into initial contact with same;

(3) applying a fluid pressure differential between opposite surfaces of said interior member and said sheet to conform said sheet to the shape of said interior member and mutually engage same, fluid trapped between said sheet and said member escaping therefrom through the channels at the periphery of said interior member as said sheet is drawn into substantial conformity with the surface having said channels; and (4) maintaining said fluid pressure differential until said sheet has cooled whereupon tensional forces arise in said sheet in all directions.

If desired more than one surface of the interior member can have channels and be covered with a corresponding skin. The fluid is preferably a gas rather than a liquid and most preferably air.

According to a second aspect of the present invention there is disclosed an article having load bearing capabilities, said article comprising a shape defining interior member and at least one external skin, said interior member having at least one surface with channels extending to the periphery thereof, said skin being a thermoplastic sheet, wherein said sheet is softened by heating and substantially conformed to the shape of the surface of said interior member having the channels by applying a fluid pressure differential therebetween which removes fluid trapped between the sheet and the member through the channels at the periphery of the surface having the channels, said fluid pressure differential being maintained until said sheet has cooled whereby tensional forces arise in said sheet in all directions.

The channels can be uniform or non-uniform, parallel or non-parallel, of the same size or of different sizes.

The channels can also include small grooves in their deepest regions to further aid in fluid removal.

BRIEF DESCRIPTION OF THE DRAWINGS

Preferred embodiments of the invention will now be described, by way of examples only, with reference to the accompanying drawings in which.

DETAILED DESCRIPTION OF THE PREFERRED EMBODIMENTS

A first embodiment of the method according to the present invention will now be described with reference to FIGS. 1 to 4. An apparatus suitable for performing this method is disclosed in the applicant's two international PCT patent application referred to earlier, the relevant disclosure of each of those specifications being incorporated herein by cross reference.

Figure 1:
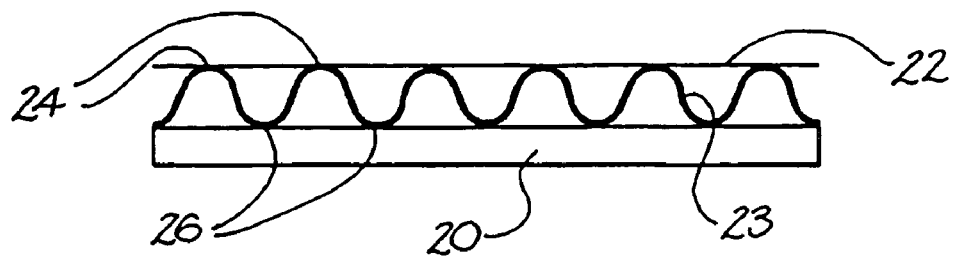
FIG. 1 is a side view of an interior member and skin at the beginning of a forming method according to a first embodiment of the invention.

FIG. 1 shows a shape defining interior member 20 and an external skin 22. The upper surface 23 of the member 20 has channels formed by regular sequential peaks 24 and troughs 26. The peaks 24 and troughs 26 of the interior member 20 can be produced from a variety of materials. A preferred form of interior member 20 is produced by removing one layer from conventional cardboard which is traditionally formed from a first outer planar layer, an inner corrugated layer and a second outer planar layer. Alternatively, the interior member 20 can be formed by removing incomplete cardboard from the manufacturing process before application of the second outer planar layer to the corrugated layer. In addition to the cardboard type structures shown, channels can be added to a surface of other materials by many means including machining, rolling, notching, scoring and the like.

Figure 2:
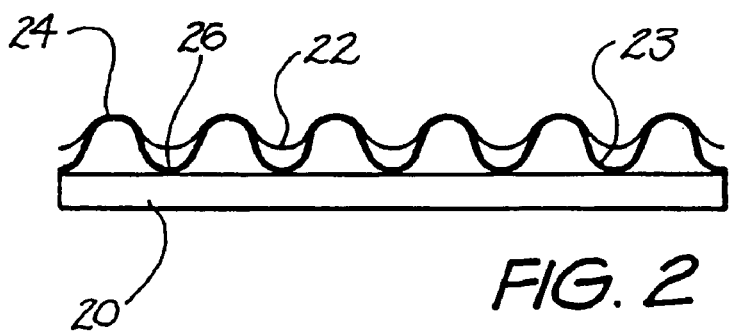
FIG. 2 is a side view of the interior member and skin shown in FIG. 1 midway through the forming method.

In the method of the present invention, the external skin 22 is formed from a thermoplastics sheet which is soften by heating and brought along side the upper surface 23 of the interior member 20 and into contact with the peaks 24 of same. A fluid pressure differential is applied, preferably by creating a vacuum by air removal, between opposite surfaces of the interior member 20 and the skin 22 to substantially conform the sheet 22 to the upper surface 23 of the interior member 20 and mutually engage same. As FIG. 1 shows, the sheet 22 initially bridges the peaks 24 and the air trapped between the sheet 22 and the upper surface 23 of the member 20 is able to escape through the ends of the troughs 26 at the periphery of the interior member 20. As the fluid pressure differential sucks the trapped air away, the portion of the sheet 22 bridging the peaks 24 begins to be drawn down into the troughs 26, as shown in FIG. 2. When nearly all of the trapped air has been removed the sheet 22 is substantially conformed to the shape of the upper surface 23. When the sheet 22 has cooled the fluid pressure differential can be removed and the finished structural article removed from the apparatus (not shown).

Figure 4:
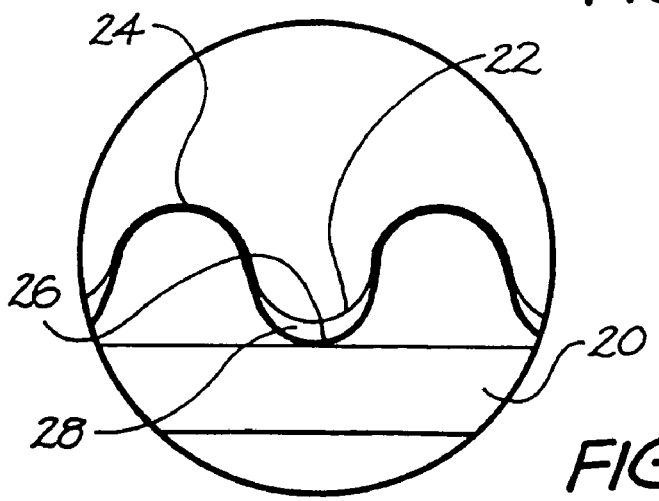
FIG. 4 is an enlarged detail view of a portion of the interior member and skin shown in FIG. 3.

As shown in FIG. 4, the above described method may not remove all of the trapped air and a small amount of the skin 22 may not confirm to the upper surface 23, as indicated by region 28 at the bottom of the trough 26.

Figure 5:
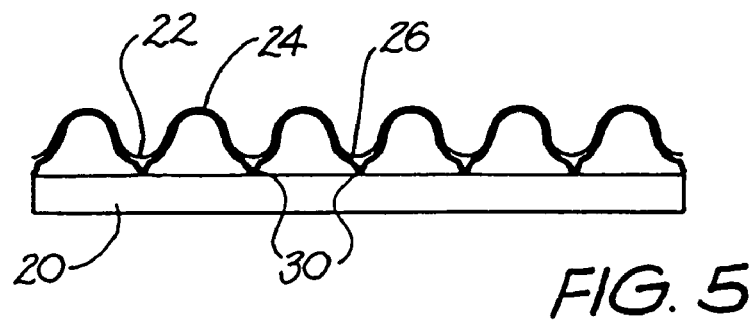
FIG. 5 is a side view of another interior member and skin at the completion of the forming method according to the invention.

FIG. 5 shows another interior member 20 which includes small grooves 30 at the bottom of the troughs 26 to reduce the size of the non-conformed regions 28. In the embodiment shown in FIG. 5, the majority of the trapped air is initially removed through the ends of the troughs 26 and a final minority portion is removed through the ends of the grooves 30.

The primary advantage of the present invention is that it allows the ARMACEL process to function without necessitating the use of at least partially fluid permeable interior members or the application of holes to non-fluid permeable interior members or interior members that have previously had one or more surfaces covered by the thermoplastic sheet.

This greatly increases the materials available for use with the ARMACEL process and, importantly, extends the ARMACEL process for use with, for example, plastics, timbers and metals.

Another advantage is the improved strength of the finished article in the longitudinal direction of the channels. In particular, the bonds between the interior member and the sheet at the sides of the channels are more resistant to failure than the bonds between planar surfaces as the bonds of the side surfaces are better able to resist the stresses applied thereto in the shear direction than the planar surfaces can resist the stresses applied thereto in the peel direction.

Strength in directions other than the longitudinal can be improved by adding channels to an opposed side of the article that are arranged at an angle to those of the first side. For rectangular articles an angle of 90 degrees between the channels on either side of the article is preferred.

Applying channels on only one side of an article can also be useful in strengthening the article in the longitudinal direction of the channels whilst leaving flexibility in a direction normal to the longitudinal direction. Such flexibility can, for example, be useful in forming curved articles. Alternatively, the channels can be arranged in more than one direction on one or more surfaces of the article which are encapsulated by the thermoplastic sheet.

A further advantage is the small portion of the sheet not adhered to the interior member at the bottom of the troughs is able to expand slightly when heated so as to reduce warping in articles that have a hotter and a cooler side, such as garage doors.

Additionally, as the method can be used with fluid impermeable interior members, it also allows application of a further thermoplastic sheet or sheets to an article on which the ARMACEL process has already been carried out to thus further improve its strength.

A surface having channels also adds a non-slip capability to the finished article.

FIGS. 6 through 12 shows various articles formed in accordance with the above described method.

Figure 3:
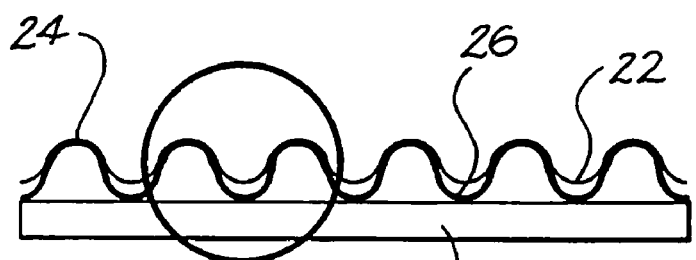
FIG. 3 is a side view of the interior member and skin shown in FIG. 1 at the completion of the forming method.
Figure 6:
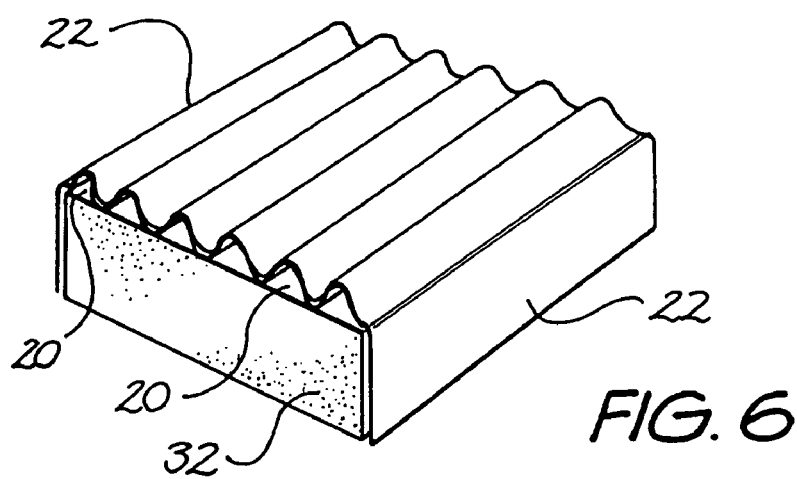
FIGS. 6 through 12 are each perspective views of various articles formed in accordance with the method of the present invention.

In particular, FIG. 6 shows a relatively thick article produced by adding the cardboard based structural member 20 shown in FIGS. 1 to 3 to a larger foam base 32 and thereafter applying the thermoplastics skin 22 to the corrugated upper surface and sides of the interior member 20 in accordance with the above described method.

Figure 7:
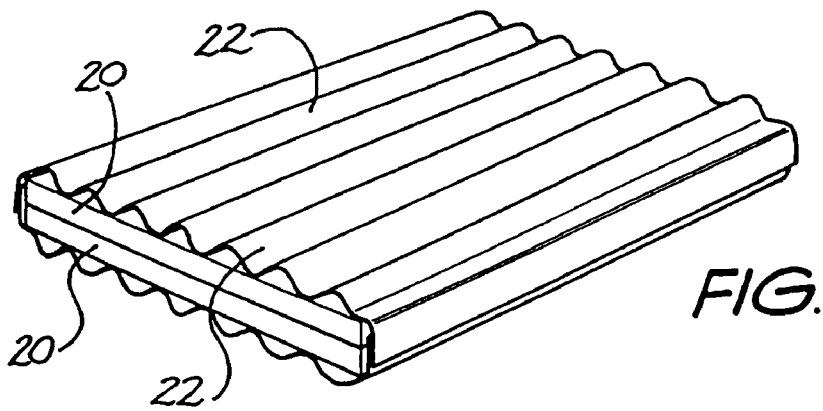

FIG. 7 shows an article formed by placing two of the interior members 20 shown in FIG. 1 back-to-back and then sequentially bonding one corrugated surface then the other. Since the trapped air is removed through the ends of the troughs 26, no additional treatment of the second side of the article (eg. punching holes) is required before applying the second thermoplastic sheet 22.

Figure 8:
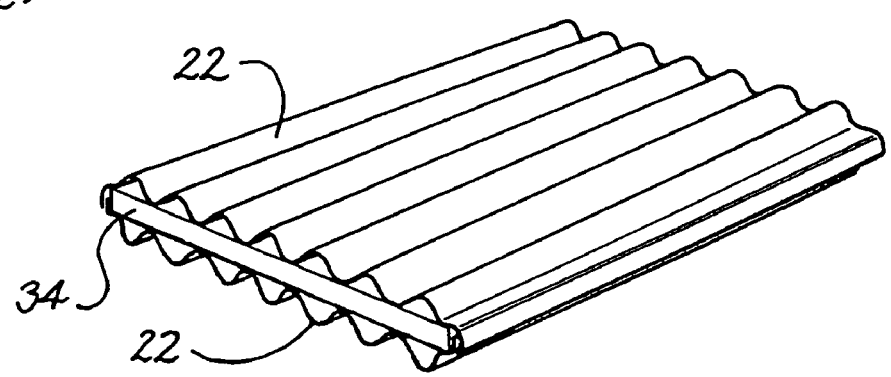

FIG. 8 shows a similar article to that shown FIG. 7 except the corrugations are provided on either side of a single interior member 34 and the sides are then sequentially encapsulated with the thermoplastic sheet 22.

Figure 9:
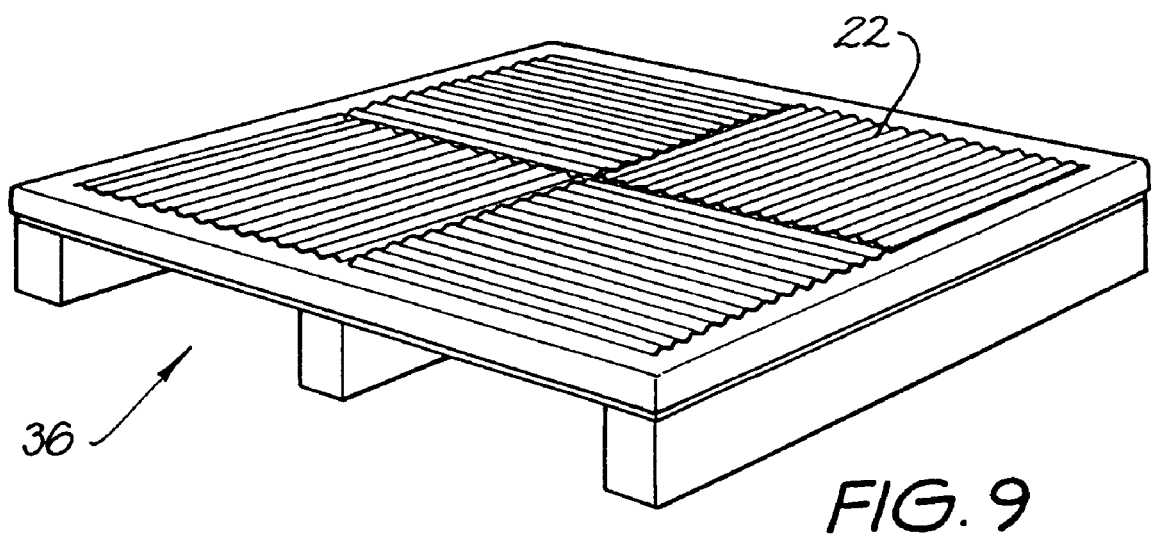

FIG. 9 shows a fork lift pallet 36 having a top to which a corrugated surface has been applied and then encapsulated with the thermoplastic sheet 22 to improve its strength and grip characteristics.

Figure 10:
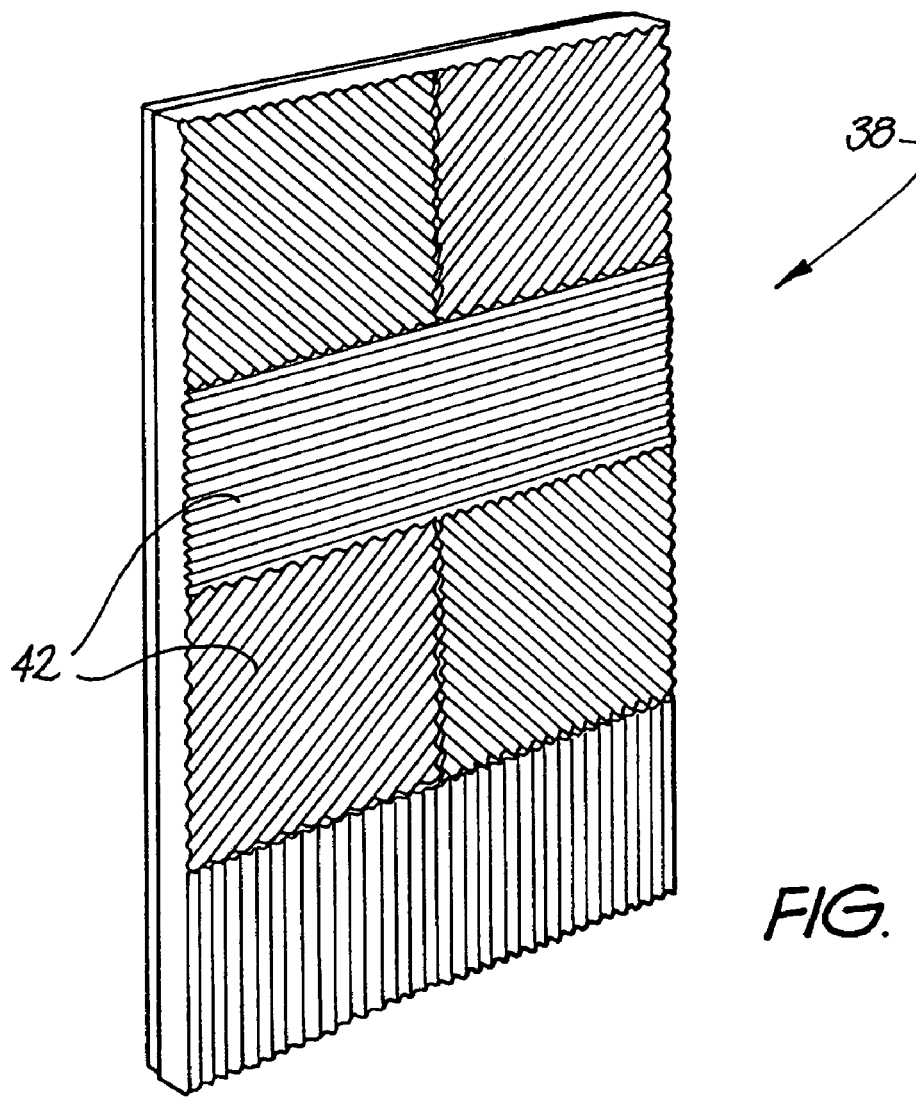

FIG. 10 shows a wall or furniture panel 38 in which a decorative finish has been produced by arranging corrugated surfaces 42 at different orientations over a surface of the panel before encapsulating with the thermoplastic sheet.

Figure 11:
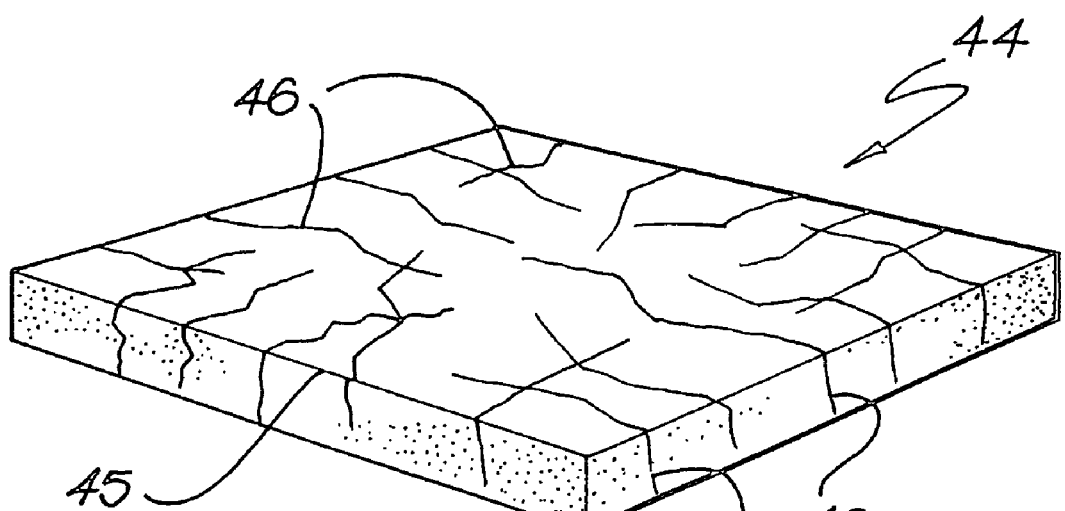

FIG. 11 shows an article 44 having an upper surface 45 with randomly orientated channels 46 therein. The channels 46 can be produced by scoring the surface 45 by coarse sandpaper, a kitchen scourer or sharp implement such as a knife. The channels 46 are too small for the thermoplastic sheet to be drawn into them and thus function similar to the grooves 30 shown in FIG. 5 in that a bridge of thermoplastic sheet forms across them. Further, in this embodiment, the channels 46 also extend down the sides of the interior member to further improve air evacuation.

Figure 12:
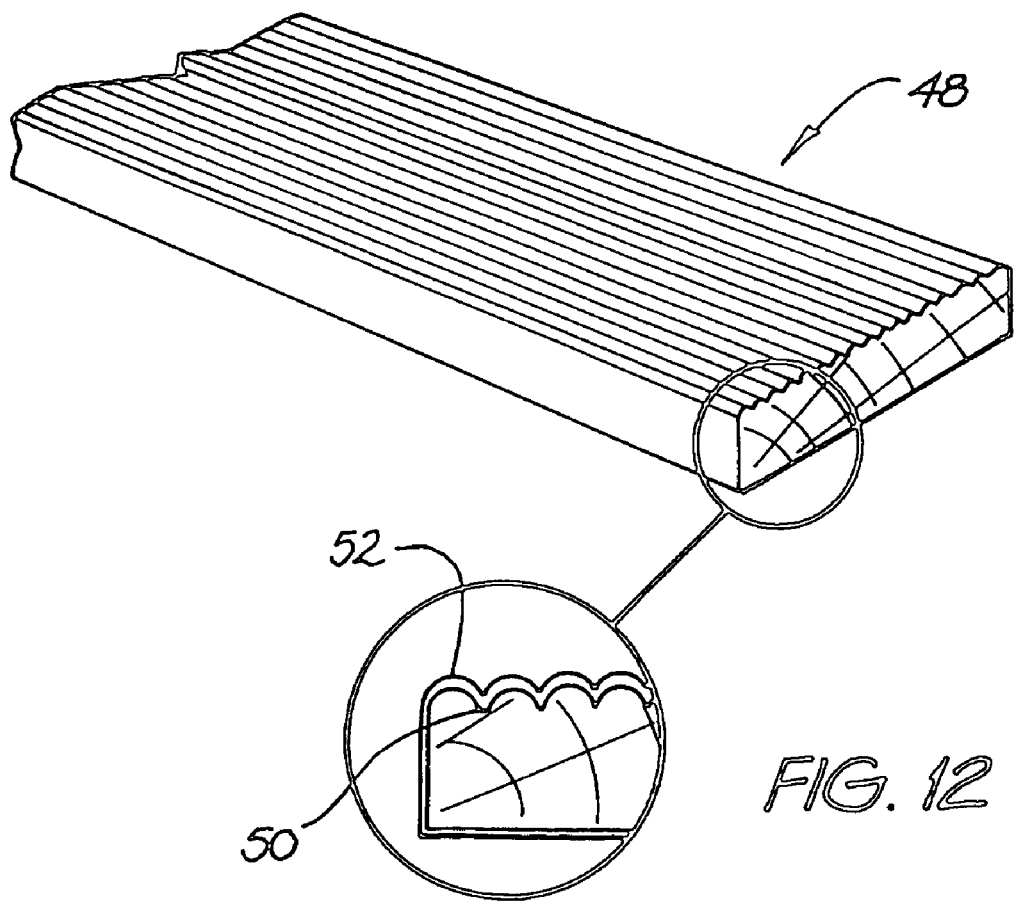

FIG. 12 shows a timber decking slat 48 with longitudinal channels 50 encapsulated by a thermoplastic sheet 52.

Although the invention has been described with reference to specific examples, it will be appreciated by those skilled in the art that the invention may be embodied many other forms.

The invention claimed is:

1. An article having load bearing capabilities, said article comprising a shape defining an interior member and at least one external skin, said interior member having at least one surface with channels extending to the periphery thereof, said channels including small grooves in their deepest regions, and said skin being a thermoplastic sheet, wherein said sheet is softened by heating and substantially conformed to a shape of the surface of said interior member having the channels by applying a fluid pressure differential therebetween which removes fluid trapped between the sheet and the member through the channels at the periphery of the surface having the channels, said fluid pressure differential being maintained until said sheet has cooled whereby tensional forces arise in said sheet in all directions.

2. An article having load bearing capabilities, said article comprising a shape defining an interior member, at least one side surface extending from the periphery of said interior member, and at least one external skin, said interior member having at least one surface with channels extending into said side surface, said channels including small grooves in their deepest regions, and said skin being a thermoplastic sheet, wherein said sheet is softened by heating and substantially conformed to a shape of the surface of said interior member having the channels by applying a fluid pressure differential therebetween which removes fluid trapped between the sheet and the member through the channels at the periphery of the surface having the channels, said fluid pressure differential being maintained until said sheet has cooled whereby tensional forces arise in said sheet in all directions.

3. The article as claimed in claim 2, wherein the article includes at least one side surface extending from the interior member periphery and said channels extend into said side surface.

4. The article as claimed in claim 2, wherein the channels are uniform.

5. The article as claimed in claim 2, wherein the channels are non-uniform.

6. The article as claimed in claim 2, wherein the channels are parallel.

7. The article as claimed in claim 2, wherein the channels are of the same size.

8. The article as claimed in claim 2, wherein the channels are non-parallel.

9. The article as claimed in claim 2, wherein the channels are of different sizes.

10. The article as claimed in claim 1, wherein the article includes at least one side surface extending from the interior member periphery and said channels extend into said side surface.

11. The article as claimed in claim 1, wherein the channels are uniform.

12. The article as claimed in claim 1, wherein the channels are non-uniform.

13. The article as claimed in claim 1, wherein the channels are parallel.

14. The article as claimed in claim 1, wherein the channels are of the same size.

15. The article as claimed in claim 1, wherein the channels are non-parallel.

16. The article as claimed in claim 1, wherein the channels are non-parallel.

* * * * *